United States Patent

[11] 3,571,527

[72] Inventors Frank E. Becker;
Walter F. Klein; William R. Yount,
Lexington, Ky.

[21] Appl. No. 698,294
[22] Filed Jan. 16, 1968
[45] Patented Mar. 16, 1971
[73] Assignee International Business Machines Corporation
Armonk, N.Y.

[54] MAGNETIC COPY SYSTEM
14 Claims, 38 Drawing Figs.

[52] U.S. Cl. .......... 179/100.2
[51] Int. Cl. .......... G11b 5/80, G11b 5/86
[50] Field of Search .......... 179/100.2 (E)

[56] References Cited
UNITED STATES PATENTS

| | | | |
|---|---|---|---|
| 3,093,709 | 6/1963 | Hoshino et al. | 179/100.2 |
| 3,476,885 | 11/1969 | Shiber et al. | 179/100.2 |

*Primary Examiner*—Bernard Konick
*Assistant Examiner*—Steven B. Pokotilow
*Attorneys*—Hanifin and Jancin and D. Kendall Cooper

ABSTRACT: The invention concerns methods and apparatus for establishing accurate positioning and registration of master and duplicate magnetic record media during a magnetic transfer operation to insure compatibility of each kind of media in a utilization device. The invention is particularly useful with media having magnetic signals recorded according to a Boustrophedonic pattern. Such a pattern is created when the record head traces a signal path having a plurality of tracks with, as an example, tracks 1, 3, 5, 7, etc. recorded left to right, tracks 2, 4, 6, 8, etc. recorded right to left, and wherein the head steps a fixed distance at the end of each track.

COPY & MASTER CARDS

Patented March 16, 1971 3,571,527

7 Sheets-Sheet 1

INVENTORS

FRANK E. BECKER
WALTER F. KLEIN
WILLIAM R. YOUNT

BY D. Kendall Cooper
ATTORNEY

Patented March 16, 1971 3,571,527

7 Sheets-Sheet 2

COPY & MASTER CARDS

COPY CARD/COPIED RECORDING

A PREFERRED

COPY STATION

B ALTERNATE

MASTER CARD

COPY CARD

MAGNETIC COPY SYSTEM

In a preferred transfer embodiment, a master magnetic record is positioned in a predetermined location in the apparatus. Individual blank magnetic record members of comparable size are positioned coextensively with the master and pressure is applied to insure good contact between master and copy. Thereafter, a drum mechanism having a plurality of permanent magnets positioned therein is moved rapidly adjacent the master and copy by manual scanning action. The mechanism imparts a large number of magnetic transitions as the drum is moved past the surface of the media, the transitions effecting transfer of the magnetic information pattern in the master to the copy.

The oxide surfaces of master and duplicate are in face-to-face contact during transfer of information. This creates a mirror image on the duplicate card so that, ordinarily, scanning by a reproducer head would have to be rephased right to left for tracks 1, 3, 5, 7, etc., and left to right for tracks 2, 4, 6, 8, etc. In the apparatus disclosed herein, the duplicate card is automatically displaced a convenient odd number of track spacings, such as five (5), in order that scanning is the same for both duplicate and master cards.

CROSS REFERENCE TO RELATED APPLICATIONS

The following applications are of interest:

U.S. Pat. application Ser. No. 698,351, C. L. Gardner, et al., inventors, entitled "Magnetic Information Transfer Apparatus," filed Jan. 16, 1968.

U.S. Pat. application Ser. No. 609,232, W. L. Dollenmayer, inventor, entitled "Transducer Driving Arrangement for Recording and Reproducing Apparatus," filed Jan. 13, 1967 now U.S. Pat. No. 3,471,654.

BRIEF BACKGROUND OF INVENTION, FIELD AND PRIOR ART

The field of the invention pertains to methods and apparatus for effecting transfer of information, such as audio and digital information, that is stored in magnetic record masters to a plurality of copy media. Prior art devices for accomplishing this function have usually had provision for moving elongated master and copy record tapes past a transfer station, the station having some form of magnetic transfer device for establishing a high frequency alternating magnetic field or a direct magnetic field. An example of a device of this nature is set forth in the Herr U.S. Pat. No. 2,738,383. In such a device, the magnetic flux field generating means establishes lines of flux and the movement of the master and duplicate tapes through the field insures a multiplicity of flux transitions to effect transfer of information form master to duplicate.

Since the record media have usually been elongated tapes, in contrast with unit record media like the familiar IBM tab card, positioning and registration of master and copy media has not been of prime importance. When unit record media are used, as in the present apparatus and related utilization devices like the Dollenmayer device referred to above, accurate location and registration of master and copy assumes greater importance. Also, displacement of the media by a predetermined factor prior to the transfer operation insures uniform scanning compatibility in the utilization device.

The transfer of magnetic information generically requires a master record media that has a higher coercivity than any of the copy record media. The transfer field established at the transfer station is selected within predetermined bounds that insure a sufficient field strength to effect the transfer of the information in the master to the duplicate media, without, however, erasing the master media. As an example, the Herr patent mentions a master coercive force in the range of 290—360 oersteds and a copy coercive force in the range of 220—290 oersteds. The maximum idealization field is controlled by the magnetic properties of the master media. With the ranges of coercive force just indicated, and particularly the range of 290—360 oersteds for the master media, satisfactory duplicate recordings are obtained with a maximum idealizing field of approximately 200—250 oersteds. In order to obtain a desired signal output, both the master and duplicate record media should have a fairly high remanence value, also, as for example, in the range of 500 gauss.

To insure suitable transfer of the magnetic information, the media, both master and copy, are subjected to at least several cycles of alternating flux fields or transitions established by rapid movement of a permanent magnet past the point of contact or tangency of master and copy. Herr found that frequencies in the range of 60 cycles per second to 120,000 cycles per second could be used for successful transfer. The movement of the media past the transfer station results in a gradual buildup of the field to a peak and a diminishing action as the media moves past and out of the transfer station. The diminishing action, that is, a diminishing flux field is the primary factor in the transfer process.

The principles of field transfer of magnetic information are made use of in the copending Gardner case referred to as well as the apparatus described herein by using, as examples, master documents with a coercivity of 600—800 oersteds and copy documents with a coercivity of 250—300 oersteds. Efficient copying has been observed to occur with as few as five to eight cycles of flux change.

SUMMARY

In accordance with the present invention, information transfer from master magnetic media to duplicate magnetic media is performed in a highly efficient manner by a method and apparatus having essentially mechanically or magnetically oriented structures arranged in a compact structure adapted for easy portability, maximum convenience, and primarily operator-oriented control of the various functions involved in the transfer operation and including means for accurately positioning and registering master and duplicate cards to insure scanning compatibility of each in a utilization device, such as the Dollenmayer device. The registration procedures also enable separate insertion, positioning, retention (gripping) and ejection of masters and duplicates, as and when required. The mirror image established on the duplicate card during a transfer cycle is automatically compensated for. In an exemplary embodiment, the portable unit receives a master card and a plurality of duplicate cards, in succession, the cards being comparable in size to the familar IBM tab card, such cards having a magnetic oxide coating on at least one side. Prior to insertion of either a master or duplicate card, a handle on the unit is raised to release pressure means and to enable insertion of the record media. Means is provided for guiding the cards into the unit, accurately positioning them with respect to one another and in relation to the transfer means and with oxide surfaces in face to face relation, and retaining them in accurate alignment during a transfer operation. To compensate for the mirror image produced in transferring information, the duplicate card is offset from the master card an odd number of tracks. Assuming a track to track spacing of 0.020 inch, a displacement of five track spacings, as an example and for convenience, is 0.1 inch (one-tenth). The spatial and dimensional relationships suggested herein are for illustration purposes, it being understood that a wide range of values can be used. The unit distinguishes a master card from a duplicate card by a notch on one end of the master card. Also, the transverse dimension (width) of the master is slightly smaller than the duplicate. The distinguishing characteristics of the two kinds of cards permits independent locating, guiding, gripping and ejecting means in the transfer apparatus for each type of card while using a common locating edge, Alternately, the cards may be offset side to side to permit separate locating, guiding, gripping and ejecting means in the transfer apparatus, and displaced one track spacing to compensate for the mirror image, if desired.

Following insertion and alignment of the media, the handle is lowered to an operating position which applies pressure by means of a pressure pad over the entire card surfaces to insure intimate contact of the master and duplicate cards. After this, the operator moves a transfer control knob which effects a relatively high speed movement of magnetic structures over the surfaces of the cards during a single scanning or sweeping action to effect the transfer of information from the master to the duplicate card. Thereafter, the handle is raised and such action ejects the duplicate card, which now has a perfect magnetic copy of the original information stored in the master card.

Ordinarily, a master card is retained in the unit for use during a plurality of transfer operations with successively inserted duplicate cards. Eventually, when a new master card with a different signal pattern is desired, the master card presently in use is ejected by appropriate eject mechanisms in the unit. As envisioned in the copending Gardner, et al. case, it is also possible to place the transfer mechanism under control of a single operator handle, thereby eliminating the separate transfer knob. That is, after insertion of an unrecorded duplicate in proximity to the master card in the unit, operation of the single handle applies pressure to the cards and subsequently trips the transfer mechanism to operate it across the cards, thereby effecting the desired transfer of information.

As described herein and in the Gardner, et al. case, the transfer means comprises a drum divided into a predetermined number of segments, each segment being defined by an elongated permanent magnet slug or insert extending longitudinally of the drum. The drum is rotated at relatively high speed, its axis moving in parallel to the surfaces of the cards, and making peripheral contact in a predetermined plane and along a line of tangency with respect to the inserted cards. As the drum sweeps across the cards, the line of tangency moves across the cards as well. The relatively higher rotative speed of the drum insures a plurality of magnetic transitions established by the magnetic slugs in the drum surface at each point of tangency during the scanning action.

The apparatus has a movable ledge feature that insures proper support for inserted cards, while enabling full insertion of the cards to the extent required.

A variety of devices for effecting the transfer of information are fully described in the Gardner, et al. case, to which reference is made.

OBJECTS

Accordingly, an object of the invention is to provide an operator-oriented magnetic transfer apparatus with simplified mechanisms and controls for establishing accurate location and registration of record media.

Still another object of the present invention is to provide magnetic transfer apparatus for effecting transfer of information stored in magnetic unit record media to a plurality of duplicate magnetic record media with compensation for mirror image relationships established during transfer operations.

Also, another object of the invention is to provide magnetic transfer apparatus with automatic alignment, retaining, pressuring, and ejecting facilities. Such facilities provide for independent handling of inserted master and duplicate cards.

A still further object of the present invention is to provide magnetic transfer apparatus and registration means that is characterized by simplified hardware and portability.

The foregoing and other objects, features, and advantages of the invention will be apparent from the following more particular description of the preferred embodiments of the invention as illustrated in the accompanying drawings.

Figure 1:
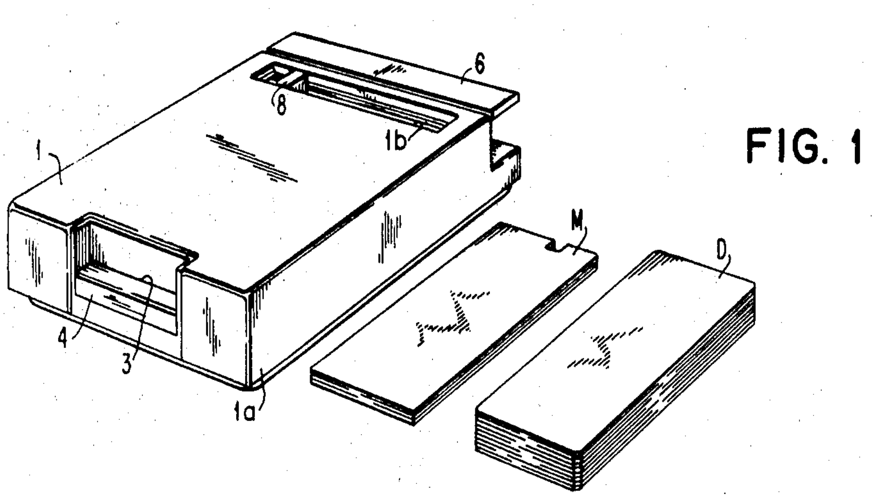
FIG. 1 is a left front perspective view of a preferred embodiment of the invention.
Figure 2:
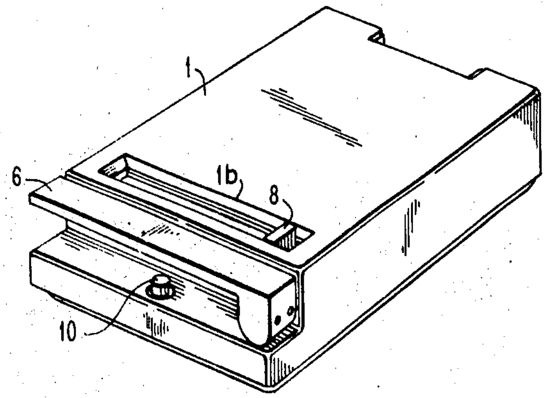
FIG. 2 is a right rear perspective view of the embodiment of FIG. 1.

FIGS. *3a*, *3b*, *3c*, and *3d* represent left end, right end, front, and rear elevation of the unit of FIGS. 1 and 2, with the cover removed.

FIGS. *4a*—*4h* are top elevations of the unit of FIGS. 1 and 2 with the cover removed and represent a typical sequence of transfer operations including entry of master card and duplicate card, movement of the transfer drum, and ejection of the duplicate card and master card.

FIGS. *5a* and *5b* illustrate movement of the drum member in the embodiment of FIGS. 1 and 2, and is related to the sequence of FIGS. *4a*—*4h*.

FIGS. *6a* and *6b* illustrate operation of the pressure pad in the unit of FIGS. 1 and 2.

FIGS. *7a* and *7b* illustrate operation of a ledge feature of the embodiment of FIGS. 1 and 2.

Figures 8, 9A, 9B, 10, 11A, 11B:
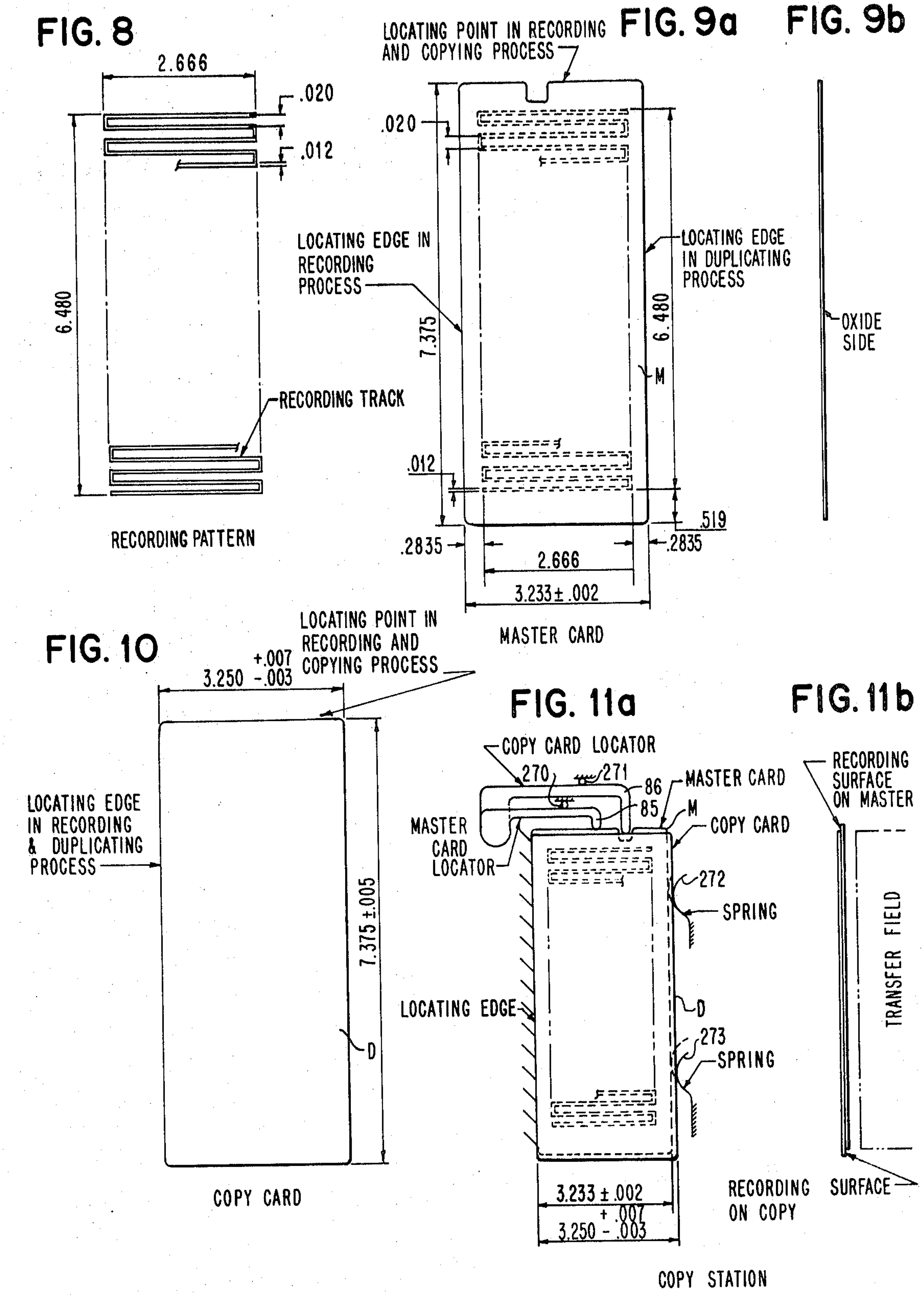

FIGS. 8—*17b* illustrate a variety of master and duplicate card locating, positioning, guiding, dimensional and registrational relationships according to the present invention, with FIGS. 8—*15a* being of special interest in connection with the apparatus of FIGS. 1—*7b*.

DETAILED DESCRIPTION

FIG. 1 represents a left front perspective view of a pressure embodiment of the duplicating apparatus according to the present invention, and FIG. 2 is a right rear perspective view of the preferred embodiment.

The structure and operation of the preferred apparatus will first be discussed by particular reference to FIGS. 1—*7b*, and the methods and hardware for registration later discussed by reference to FIGS. 8—*15a* and FIGS. *15b*—*17b*.

FIGS. *3a*—*7b* show various structural features of the preferred embodiment with FIGS. *4a*—*4h*, in particular, representing a sequence of operations in effecting transfer of magnetic signal flux patterns from master cards to duplicate cards. Referring to FIGS. 1 and 2, the essential mechanical components of the apparatus are contained in a housing 1. It is assumed that front panel 1*a* faces the user during operation. Positioned next to the duplicating apparatus is a stack of master cards M having recorded information flux patterns, audio or digital in nature, and a second stack of duplicate cards D on which flux patterns from the master cards M are to be recorded by transfer sequences. The unit has a card insertion slot 3 with associated movable ledge 4. Operation of ledge 4 is particularly shown in FIGS. *7a* and *7b*. Arranged at the right end of the unit, is a handle 6 mounted for pivotal movement from the position shown to a raised condition shown in other views, such as FIG. *6a*. When in the lowered position, handle 6 and associated mechanism establish proper pressure between a master card M and a duplicate card D to insure their close proximity for proper transfer of information.

Positioned in an opening 1*b* of housing 1 is a transfer drum handle knob 8. Handle 8 is arranged to move forwardly and backwardly in slot 1*b* to move the transfer drum in the unit in the opposite direction, that is, backwardly and forwardly. The unit also has a master card eject button 10. FIGS. *3a*—*3d* are related plan elevations of the unit in FIGS. 1 and 2 with the cover 1 removed. FIG. *3a* is a left elevation of the unit showing slot 3, ledge 4, and transfer drum 11. Drum 11 has a pinion gear 12 engaging a rack 13. FIG. *3b* is an elevation of the opposite (right) end of the unit showing handle 6 and the opposite end of drum 11. This end of drum 11 also has a pinion gear engaging a rack similar to that shown in FIG. *3a*. All of the FIGS. including FIGS. *3a*—*3d*, show that the major components of the unit are supported by a base frame 15 and an intermediate frame 16.

The pinion and rack relationship to the peripheral surface of drum 11 establishes a high speed movement of magnetic slugs 11*a* that are spaced at equal intervals in the drum structure. In the case illustrated, six slugs are provided. During a single movement of handle 8 from front to back or back to front, the gear relationships established insure sufficient transitions of the magnetic slugs across the width of the master and duplicate cards. Only one movement, either front to back or back to front, is required to effect transfer of the information in the master card to the duplicate card. The movement of drum 11, by handle 8 is effected by a pulley arrangement shown particularly in FIGS. 5*a* and 5*b*. The pulley arrangement is also shown in the sequence views of FIGS. 4*a*—4*h*. Associated with handle 8 is a nylon bushing 20 mounted for sliding movement on a rod 21. Concentrically mounted on the same shaft 23 on which handle 6 is mounted is a slotted rubber roller 25. Another roller 26 is mounted by bracket 27 to intermediate frame 16. A third roller 28 is supported by bracket is supported by bracket is supported by bracket 29 on lower frame 15. A fourth roller 30 is supported by a bracket 31 on lower frame 15. The four rollers 25, 26, 28, and 30 are arranged in a vertical plane and accommodate a cord 33 that is attached by clips 35 and 36 to nylon bushing 20. Cord 33 is further attached by clips 38 and 39 to a hub 49 extending from the right end of drum 11. With the foregoing cord and roller arrangement, movement of drum handle 8 forwardly moves drum 11 rearwardly and the converse is true.

Figure 3A:
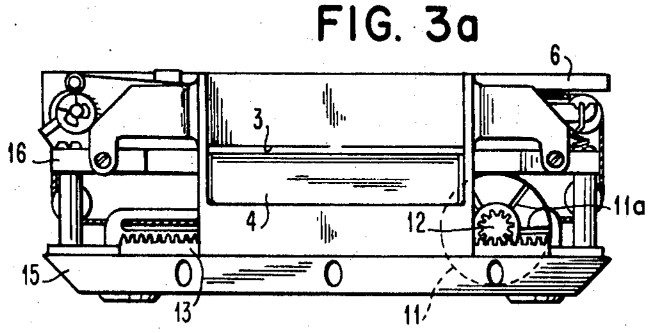
Figure 3B:
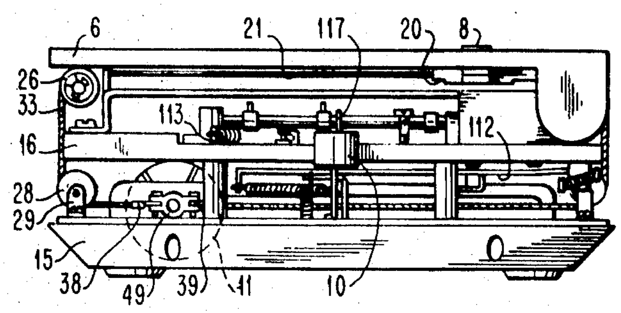
Figure 3C:
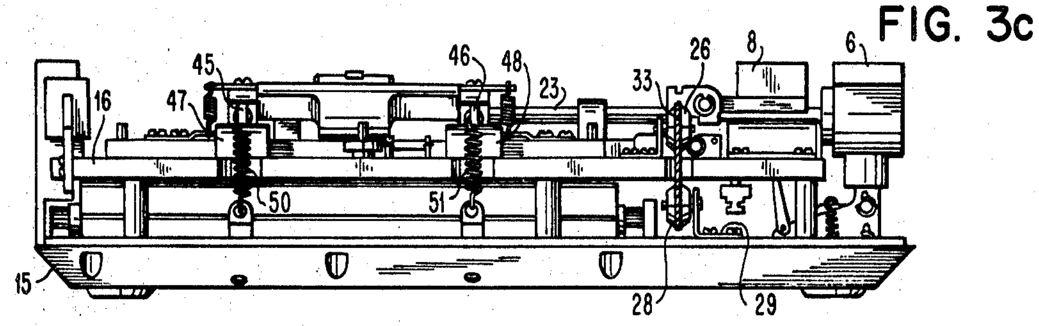
Figure 3D:
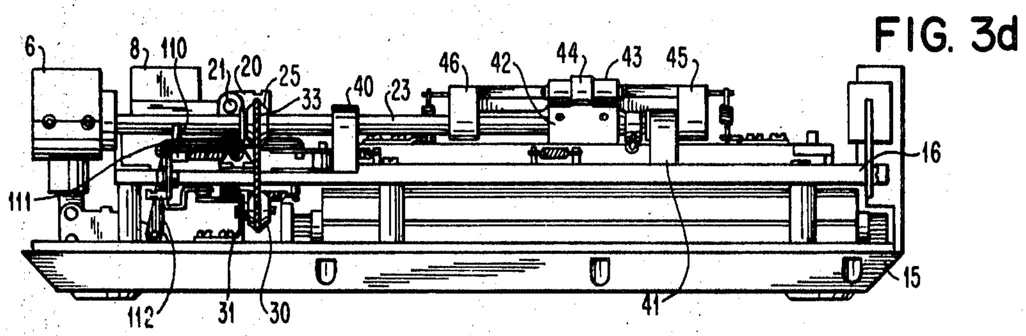
Figure 6A:
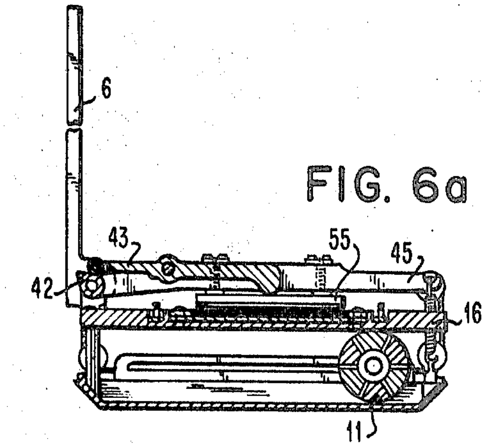
Figure 6B:
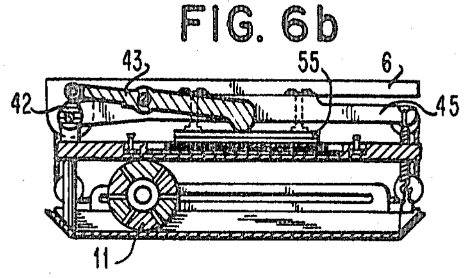

Extending vertically from intermediate frame 16 are bushing supports 40 and 41 for supporting shaft 23. Shaft 23 is mounted for free rotation within bushing supports 40 and 41 and rotative movement of handle 6 effects such rotation of shaft 23. Affixed to shaft 23 is a cam element 42 arranged underneath one extremity of a cross-shaped bail member 43. Contact of cam 42 with bail 43 is through roller bearing 44. Two other extremities of bail 43 are pivotally mounted in bail support members 45 and 46. Support members 45 and 46 are mounted at the rear extremities on shaft 23 that is freely rotatable therein and extend toward the front of the unit for support on upright members 47 and 48 that can best be seen in FIG. 3*c*. Springs 50 and 51 attached to lower frame 15 are engaged at their upper extremities with the forward extremities of bail support members 45 and 46 to maintain pressure on members 45 and 46 in a downward direction. FIGS. 6*a* and 6*b* illustrate the pivotal relationships of bail 43 and support members 45 and 46, particularly member 45, with handle 6 in a raised position (FIG. 6*a*) and in a lowered position (FIG. 6*b*).

Positioned underneath bail 43 is a pressure plate 55 with two rear extensions 60 and 61 and a forward extension 62. See FIG. 4*a*, especially. Extensions 60, 61, and 62 are drilled for free vertical reciprocation on stud elements 65, 66, and 67. Integral with plate 55 are bracket members 70—73 that are attached to plate 55 by screws. Brackets 70—73 have associated spring elements 75—78 extending upwardly for attachment to brackets 80 and 81 on support member 45 and brackets 82 and 83 on support member 46.

Cam member 42 is cut in such a manner that when handle 6 is in a lowered position, cam member 42 bears against roller 44 raising the rear extremity 43*a* of bail 43 and lowering the forwardly extending extremity 43*b* of bail 43 downwardly against pressure plate 55 and in opposition to the normal tension exerted by springs 75—78. Thus, pressure plate 55 moves downwardly on studs 65, 66, and 67 against a set of master and duplicate cards when positioned in the unit for a transfer operation.

Near the very end of the swing of handle 6 to its downward position, cam member 42 presses upwardly against bail 43 sufficiently to exert pressure by the pivotal connections of bail 43 with support members 45 and 46, thereby slightly raising support members 45 and 46 upwardly about their rotative mountings on shaft 23 and against the tension provided by the respectively associated spring elements 50 and 51. The somewhat larger clearance between pressure pad 55, ledge 4, and intermediate frame 16 is observable in FIG. 6*a* with handle 6 up. This enables insertion or removal of master and duplicate cards. In FIG. 6*b*, handle 6 is down and pressure plate 55 is exerting pressure against cards inserted in the unit.

TYPICAL OPERATION

Figure 4A:
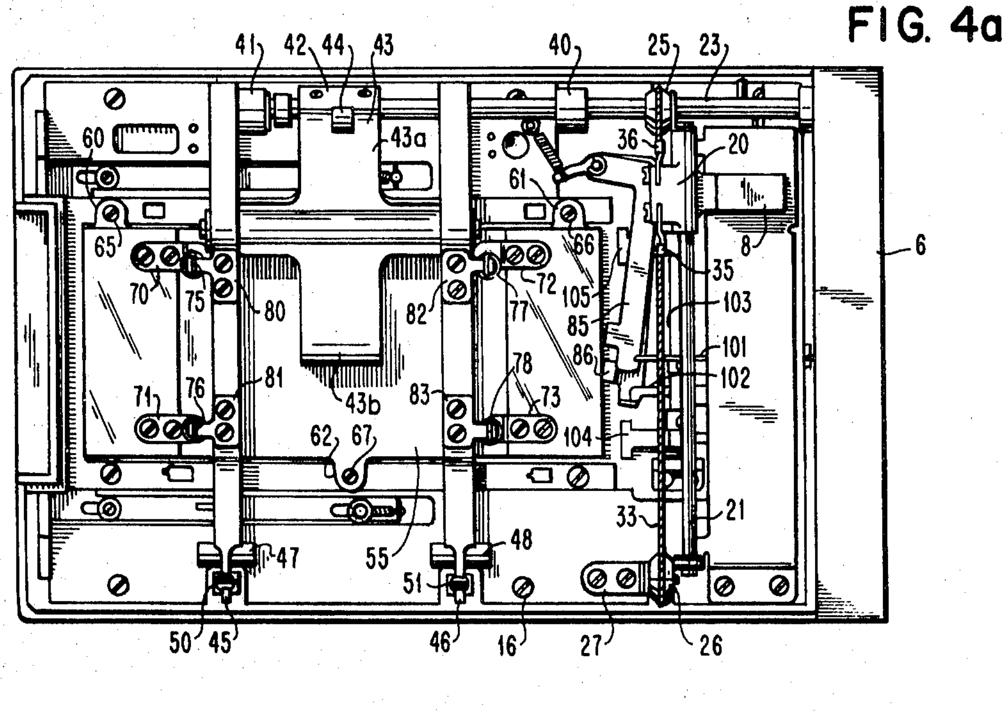

FIGS. 4*a*—4*h* illustrate a typical sequence of operations of the unit for effecting transfer of a magnetic pattern from a master card to a duplicate card. All of these FIGS. are top elevations of the unit in different stages of the operation. FIG. 4*a* represents the initial stage of the unit with the handle down, no cards inserted, the pressure plate engaged downwardly, and the drum knob 8 positioned toward the rear of the unit. Because of the pulley system previously described, this means that the drum or roller 11 is toward the front of the unit ready for movement toward the rear of the unit.

Figure 4B:
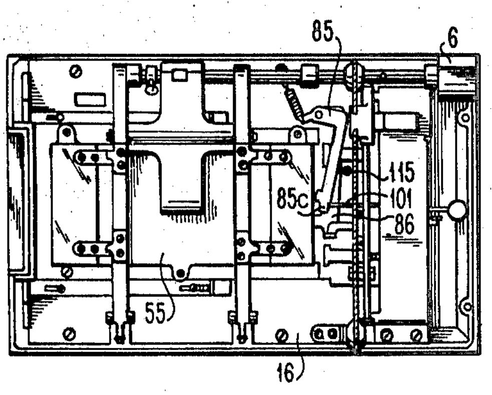
Figure 5A:
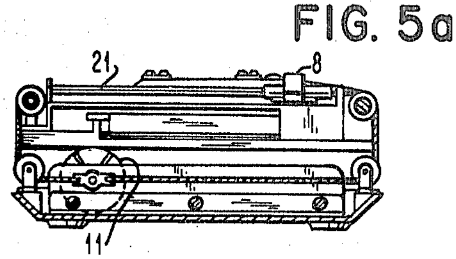
Figure 5B:
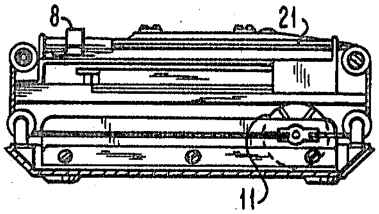

As a first step in the operation, handle 6 is raised to a vertical position as shown in FIG. 4*b*. This raises pressure plate 55 out of contact with the card bed formed in the intermediate frame member 16. At this time, the relationship of pressure plate 55 with ledge 4 and frame member 16 is shown in FIG. 6*a*.

It is assumed that, as in the Dollenmayer device, the recording of master cards and reproducing of master and duplicate cards takes place while the cards are positioned oxide down, the scanner tracing a path underneath the card. The transfer process requires a face-to-face relation and therefore, the master is positioned in the transfer apparatus oxide up and the copy card oxide down in contact with the master card. Because it is necessary to turn the master card over, the Boustrophedonic signal pattern on it is very accurately centered so that one edge of the master can be used for locating it in the recorder-reproducer and the opposite edge used for locating it in the transfer device, FIG. 9*a*.

Only one edge of the copy card is required for locating purposes in both the recorder-reproducer and transfer devices and accordingly, the signal pattern on it may be slightly off-center and it may be slightly wider for independent registration, FIG. 11*a*.

Figure 4C:
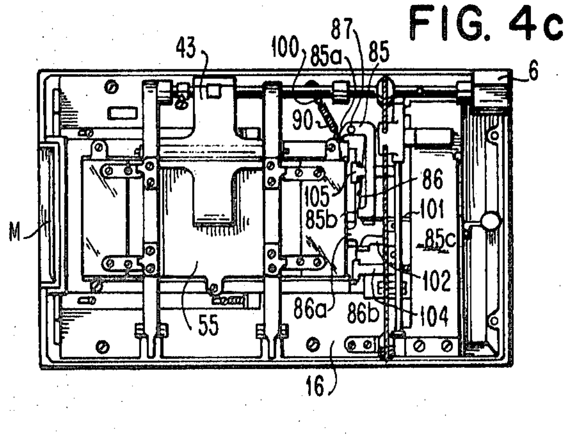

Following release of pressure plate 55, a master card with the oxide up is inserted in the unit from left to right as seen in FIG. 4*c*. The master and copy cards are adapted for cooperation with bell crank elements 85 and 86 that are pivotally mounted for rotation about a stud at 87. A spring 90 attached to frame member 16 by stud 100 exerts tension on an extension 85*a* of bell crank member 85 in a clockwise direction. Normal tension of extension 85*b*, therefore, is to the left in FIG. 4*c*. Bell crank member 85 is arranged to sense the presence of a master card in the unit and has an associated latch member 101 arranged to catch extension 85*c* of bell crank 85, when a master card is fully inserted. Member 86 has an extension 86*a* and a further extension 86*b* arranged for engagement with a latch 102 when a copy card is subsequently inserted. All of the master cards have notches appropriately provided at the innermost extremity, FIGS. 1 and 9*a*, and any inserted master card will engage extension 85*b* of bell crank 85 to latch it under latch 101 but will not engage extension 86*a* of bell crank 86, due to the notch location. The notch is located to clear the copy card sensing means in the unit to thereby distinguish a master card from a duplicate card. Location of the notch slightly offcenter permits a more compact arrangement of master and duplicate card sensing means.

In FIG. 4*c*, master card M has engaged extension 85*b* of bell crank 85 latching it by latch 101. Latch 101 is affixed to a shaft 103 having extending card grippers 104 and 105. As soon as latch 101 drops down to latch extension 85*c* of member 85, shaft 103 rotates thereby carrying card grippers 104 and 105 downwardly to engage the top surface of master card M, thereby securely holding master card M in a steady condition.

Figures 7A, 7B:
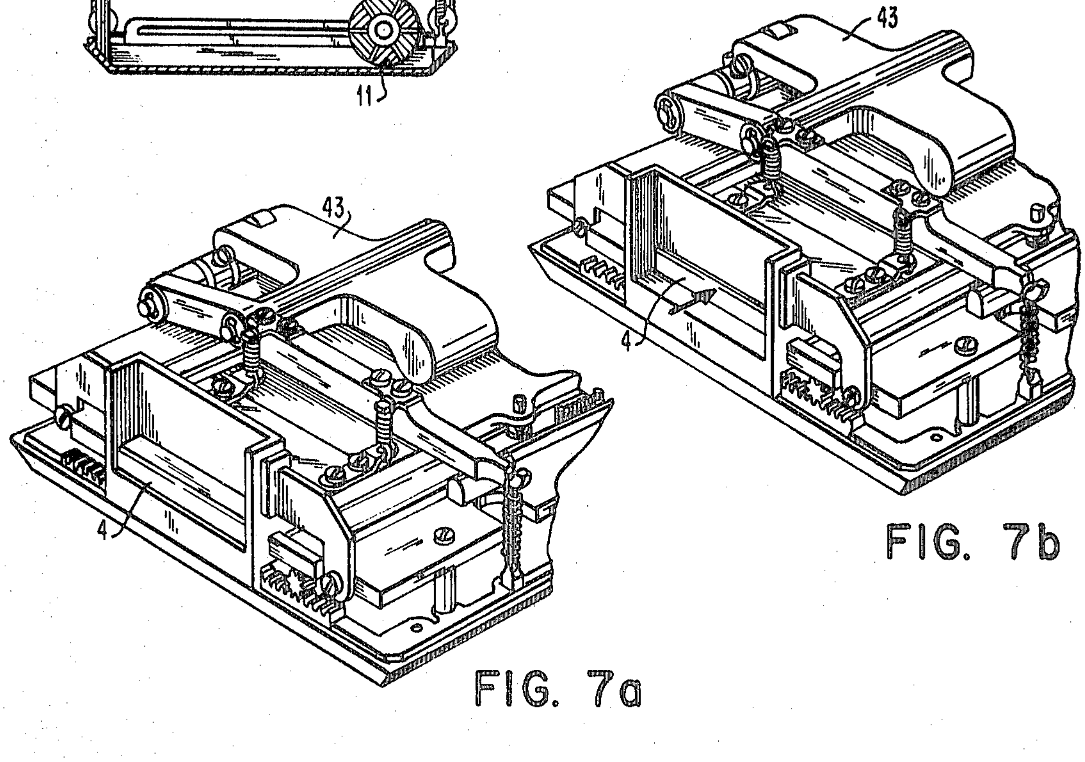

During insertion of either a master card M or a duplicate card D, ledge 4 initially supports the card or cards during movement into the apparatus but is movable inwardly from the condition shown in FIG. 7*a* to that shown in FIG. 7*b* to insure that the operator is able to fully insert the card or cards involved.

Figure 4D:
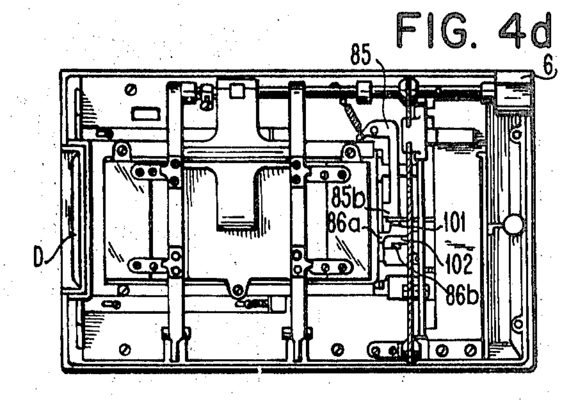

Following full insertion of master card M into the unit, a copy or duplicate card D is inserted in slot 3 on top of master card M and with the oxide down. FIG. 4*d* illustrates the condition of the unit with the duplicate card also in position. Since none of the duplicate cards D are notched, any inserted duplicate card will contact extension 86*a* of bell crank 86 moving it to the right for latching by latch element 102. As shown in FIG. 4*d*, the arrangement of elements results in a slight displacement of the duplicate card from the master card to the extent of exactly 0.1 inch (one-tenth) which represents five tracks (odd number) (0.020 inch per track) of displacement. This is done to insure scanning compatibility in a utilization device, such as the recording and reproducing apparatus disclosed in the Dollenmayer application, referred to above. The placement of the oxide surfaces of master and duplicate adjacent one another results in a mirror-image of the information pattern on the copy card. If not compensated for, this will require handling of master cards in a utilization device one way, and special handling of copy cards in another way. This is especially true when the Boustrophedonic pattern is used for storing information, that is, a pattern involving scanning of the card in a first direction, stepping, scanning in an opposite direction, stepping, etc. This establishes a sequence of track segments that are alternately opposite in direction, such as 1, 3, 5, 7 etc., left to right scan, and 2, 4, 6, 8 etc., right to left scan. A mirror image of the tracks on a copy card in relation to the master card used as a source requires that scanning be just the reverse of that indicated and complicates the utilization device. In the embodiment of FIGS. 1—7*b*, the copy card is displaced a convenient odd number of track segments, such as five (5) so that subsequent scanning of the copy card is performed the same as a master card. This aspect of the method and apparatus is fully described in a later section herein.

Figure 4E:
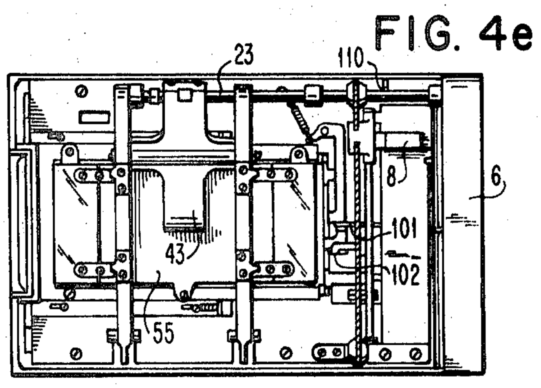

At this point in the operation, handle 6 is lowered as shown in FIG. 4*e*. This pivots bail 43 which, by the action previously described, moves pressure plate 55 down against the inserted master card M and duplicate card D.

Figure 4F:
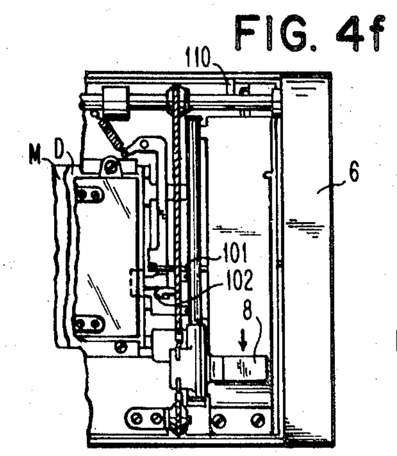

Subsequently, knob 8 is moved from the rear position shown in FIG. 4*e* to the front position shown in FIG. 4*f* which effects movement of the magnet roller from front to rear, as previously described. The information contained in the master card is thereby transferred to the duplicate card and also retained in the master card for subsequent copying operations.

Figure 4G:
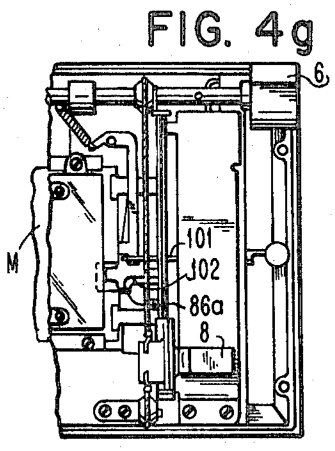

When the transfer operation has been completed, handle 6 is raised to the position shown in FIG. 4*g*. This accomplishes several things. Raising of handle 6 releases pressure on pressure plate 55 permitting free movement of the inserted cards. Also, raising of handle 6 ejects the copy card in the following manner. As can be seen most clearly in FIGS. 3*d*, 4*e*, and 4*f*, associated with handle 6 and projecting from shaft 23 is an eject stud 110. When handle 6 is raised to the position shown in FIG. 4*g*, stud 110 is moved downwardly against a projecting element 111 of a slide assembly 112 that is arranged for reciprocation from front to back, and back to front in the unit. Slide assembly 112 carries a pin 113, FIG. 3*b*, that is attached to one end of the latch member 102. Movement of slide assembly 112 toward the front of the unit rotates latch 102 clockwise in FIG. 4*g*, thereby unlatching bell crank 86 so that it moves to the left. Since extension 86*a* of bell crank 86 is in engagement with duplicate card D, movement of bell crank 86 to the left also moves card D to the left toward an eject position. The actual movement of bell crank 86 to the left is accomplished specifically by slide 112 moving a pin 115 that is more clearly seen in FIG. 4*b*. This occurs during the movement of slide 112 toward the front of the unit with pin 115 acting against bell crank 86 to move it to the left.

The production of numerous duplicate cards D is accomplished by repeating the insertion, transfer, and ejection operations illustrated in FIGS. 4*d* through 4*g*. While transfer operations take place, the master card remains in position as shown in FIG. 4*c*.

Figure 4H:
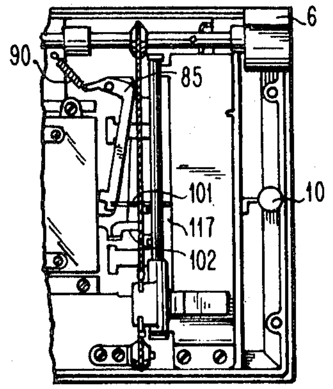

Eventually, a point is reached in the operation when a new master card is desired for transfer operations. At this time, master eject button 10 is depressed. Referring to FIG. 4*h*, depression of master eject button 10 releases bell crank 85 from latch 101. This is very simply effected by a link element 117 that is moved downwardly by eject button 10, thereby raising latch 101 and enabling bell crank 85 to rotate in a clockwise direction moving master card M to an eject position due to the tension exerted by spring 90. Master card M can then readily be removed from the unit and a new master card M inserted for subsequent operations.

TYPICAL REGISTRATION CRITERIA, AND FURTHER DISCUSSION OF METHOD AND APPARATUS

FIGS. 8—15*a* illustrate typical registration criteria and practice of the method with the embodiment of FIGS. 1—7*b* while FIGS. 15*b*—17*b* illustrate an alternate method. The criteria drawings show the recording pattern, master and duplicate (copy) dimensional and physical relationships, registration of master and duplicate for transfer operations, and sensing, guiding and locating criteria.

FIG. 8 illustrates a Boustrophedonic recording and reproducing scanning pattern established in a device like the Dollenmayer recorder-reproducer. The record (playback) head moves left to right, then right to left with an escapement occurring at the end of each track by a finite amount. In the case illustrated each track has a nominal width of 0.012 inch and track-to-track spacing is 0.020 inch. Throughout the description and drawings, such dimensions are intended to be illustrative only and not limiting.

A master record card M is shown in FIGS. 9*a* and 9*b*. The card has a notch along the upper edge. Preferably, it is a magnetic oxide coated polyester fiber. As discussed, its magnetic coating has higher coercivity than a copy card. The recording pattern of FIG. 8 is symmetrically centered on the master card permitting the card to be turned over and located by the opposite edge during a copying process, but maintaining the recorded pattern the same distance from the locating edge used.

The copy card D, FIG. 10, has the same longitudinal dimension as the master card M, that is, 7.375 inch but is slightly larger across the width, 3.250 inch versus 3.233 inch. This enables the use of common spring pressure means for locating each card as shown in FIG. 11*a*. The copy card is a magnetic oxide coated plastic polyester or paper stock.

The relationship of the cards in the copying apparatus of FIGS. 1—7*b* is shown in FIGS. 11*a* and 11*b*. The master card copy locators correspond to bell cranks 85 and 86, respectively, FIG. 4*a*. The locators are movably positioned with associated stops 270 and 271 to establish an offset relationship of cards M and D a distance of a desired odd number of track spacings which for convenience has been selected as five (5) in number. Total displacement is 0.1 inch (one-tenth inch, or 5 × 0.02 inch). This provides room for separate clamping of the master card by grippers 104 and 105, FIGS. 4*a* and 4*c*. The copy station provides a locating edge for the cards, FIG. 11*a*, which is equal in length to the length of the cards. Spring elements 272 and 273 urge the cards against the locating stop, advantage being taken of the difference in width of the cards.

Spring elements 272 and 273 first act against the master card when it is inserted to urge it against the locating stop, and later act against the copy card when it is inserted to urge it against the locating stop.

Figure 12:
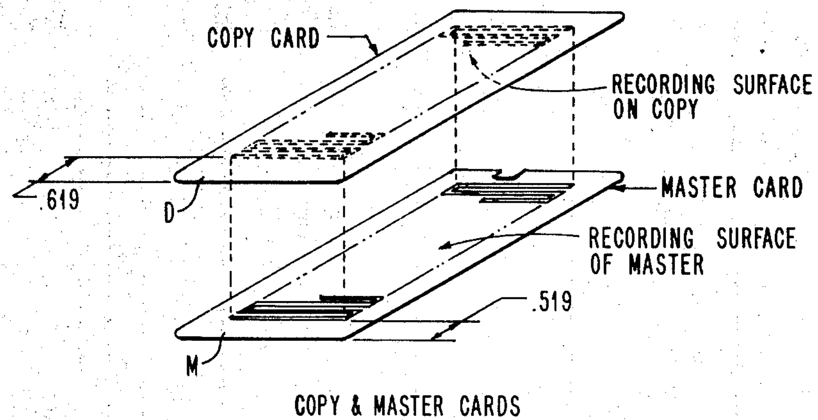
Figure 13A:
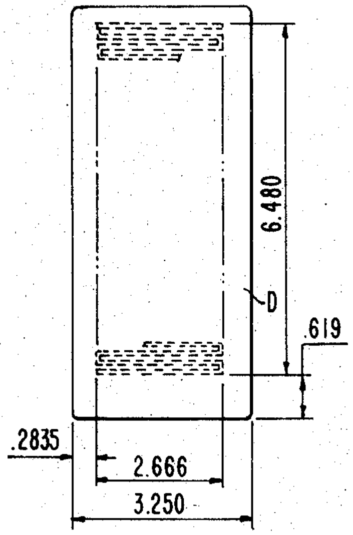
Figure 13B:
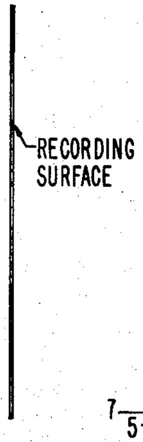

The two cards are positioned in unit 1 with the 0.1 inch offset, the magnetic surface of the master card M up, and the magnetic surface of the copy card D down, in face-to-face relation, FIG. 12. Pressure is then exerted and an external magnetic field applied as previously described to duplicate the information on the master into the copy. When completed, the copy card is ready to be placed in a reproducer, such as the Dollenmayer device. The duplicated pattern is shown in FIG. 13*a*.

Due to the symmetry of signal pattern on the master card and the fact that the copy card is located always on the same edge in either a recorder-reproducer device or the transfer device, the signal pattern is accurately established on the copy card with respect to the locating edge used on it to insure precise scanning of the information.

Figures 14A, 14B, 14C:
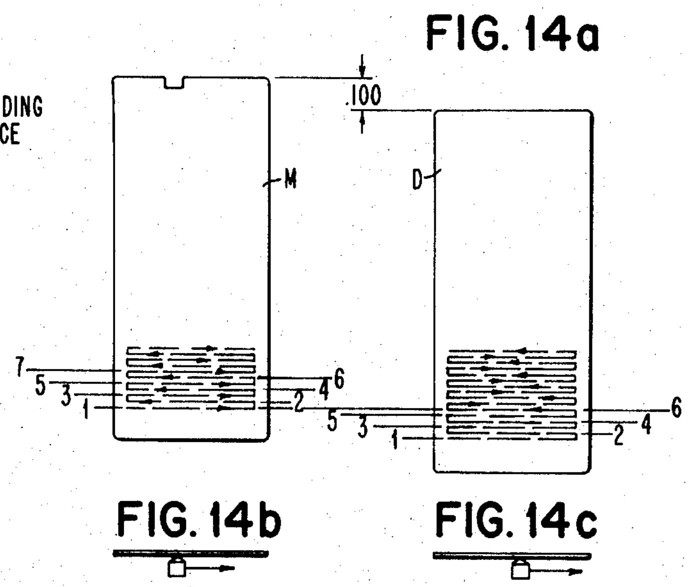

As shown particularly in FIG. 14*a*, the copying process establishes a mirror image pattern in the copy card. For economics in manufacturing and simplicity of operation, it is desirable that scanning in the utilization device, such as the Dollenmayer device, be of constant and uniform pattern, as shown for master card M, that is, as an example, tracks 1, 3, 5, 7 etc. scanned left to right and alternate tracks 2, 4, 6, 8 etc. scanned right to left. The mirror image on the copy card would ordinarily require rephasing of the scanning mechanisms in order to properly scan the mirror image tracks. That is, scanning would have to be just the opposite, e.g., right to left for tracks 1, 3, 5, 7 etc. and left to right for tracks 2, 4, 6, 8, etc.

In accordance with the present invention, the mirror image and scanning situation is easily resolved by displacing the copy card D an odd number of track spacings with respect to master card M prior to the transfer operation. Any convenient displacement, such as 1, 3, 5, 7 or more track spacings can be used. In this case, the displacement is five (5) track spacings or 0.1 inch (5 × 0.02 inch). This lines up track 1 on the master card with track 6 on the copy card, establishes compatibility of each card with the other and permits uniform scanning direction in the utilization device, FIGS. 14*b* and 14*c*. The chosen displacement of five track spacings gives an adequate separation longitudinally for independently clamping the master card and satisfies the odd number requirement. The displacement also results in five (5) blank tracks and the last five (5) tracks on the master should ordinarily not be recorded.

Figure 15A:
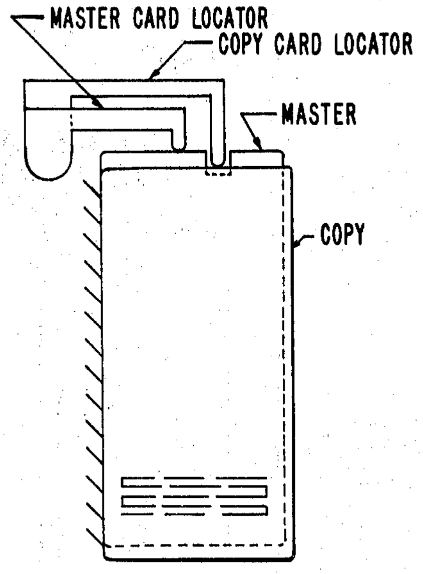
Figure 15B:
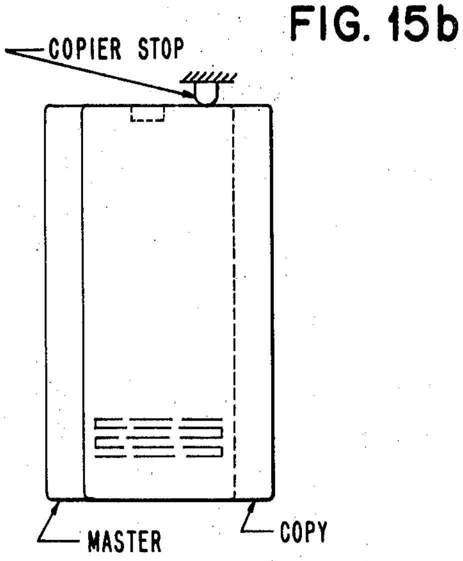

FIG. 15*a* is provided for convenient comparison of the preferred longitudinal displacement method just described with an alternate side-to-side displacement method shown in FIG. 15*b*. The method of FIG. 15*b* does not compensate for the mirror image situation, but does allow independent handling and clamping of the two types of cards. The mirror image may be compensated for in FIG. 15*b* by an additional slight longitudinal displacement such as 0.02 inch, or one track spacing.

The version of FIG. 15*b* results in shorter tracks and less overall recording time on the media.

Figures 16A, 16B, 17A, 17B:
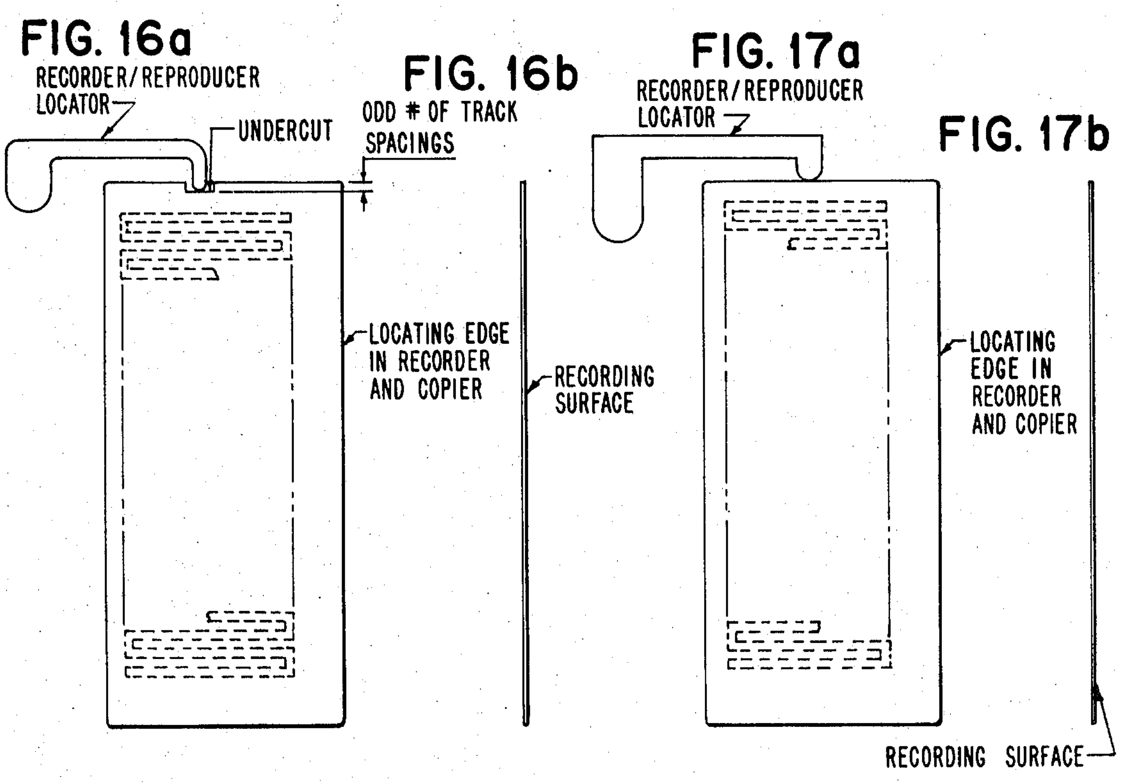

Another way of handling the mirror image is to notch (undercut) the master card an amount equal to an odd track space displacement, FIGS. 16*a* and 16*b*, but to omit such notch in the copy card, FIGS. 17*a* and 17*b*. The utilization device now senses the notch (or its absence) and positions each type of card differently to insure uniform track scanning.

The methods and apparatus described herein provide simplified copying of cards; eliminates rephasing of the utilization device; requires that only the master card have rigid dimensional control; permits same locating surfaces for the copy card in recorder and copier; provides independent clamping of master and copy; enables independent movement of the copy card without disturbing the master in the copier; and permits accurate location of either type of card against a common locating means.

While the invention has been particularly shown and described with reference to several embodiments, it will be understood by those skilled in the art that various changes in format and detail may be made without departing from the spirit and scope of the invention.

We claim:

1. A method for producing a duplicate record media having at least one oxide surface from a master record media having at least one oxide surface and a recorded signal pattern in conjunction with magnetic transfer apparatus having provision for clamping at least one of said media during operation, said master and duplicate record media each have comparable longitudinal and transverse dimensions, and said master record media carrying a Boustrophedonic signal pattern having a plurality of signal tracks each separated by a track spacing, comprising the steps of:

1. positioning said master record media in said apparatus with its oxide surface facing a first direction;
2. positioning said duplicate record media in said apparatus with its oxide surface facing the oxide surface of said master record media in a transverse offset relation with respect to said master record media in order to provide clearance for operation of said clamping means and at least one odd number of track spacings with respect to said master record media in order to insure scanning compatibility of both master and duplicate record media in a utilization device; and
3. operating said transfer apparatus to effect transfer of said signal pattern from said master record media to said duplicate record media such operation producing a mirror image of said master signal pattern in said duplicate record media.

2. Apparatus for producing a duplicate record media having at least one oxide surface from a master record media having at least one oxide surface and a recorded signal pattern, said master and duplicate record media each have comparable longitudinal and transverse dimensions and said master record media carrying a Boustrophedonic signal pattern having a plurality of signal tracks, each separated by a track spacing, comprising:

means for clamping at least one of said media during operation;

means for positioning said master record media in said apparatus with its oxide surface facing a first direction;

means for positioning said duplicate record media in said apparatus with its oxide surface facing the oxide surface of said master record media and in a transverse offset relation with respect to said master record media in order to provide clearance for operation of said clamping means;

positioning means to position said duplicate record record media at least one odd number of track spacings with respect to said master record media in order to insure scanning compatibility of both master and duplicate record media in a utilization device; and means for operating said transfer apparatus to effect transfer of said signal pattern from said master record media to said duplicate record media, said operation producing a mirror image of said master signal pattern in said duplicate record media.

3. A method for processing in a common utilizing device having track scanning means, a master card with a Boustrophedonic signal pattern having a plurality of odd numbered and even numbered alternate signal tracks and a copy card with a comparable signal pattern, but as a mirror image thereof, comprising:

1. providing a distinguishing characteristic on at least one type of card, said characteristic being equal to at least one track spacing or an odd number thereof; and
2. sensing said characteristic in said utilization device to relatively displace at least one type of said cards an appropriate track spacing distance to enable scanning of signal patterns to proceed in a preferred signal pattern scanning sequence for either type of card.

4. The apparatus of claim 3 wherein; said characteristic is provided in said master card.

5. Apparatus having means for scanning a Boustrophedonic signal pattern on magnetic record media of a first master type having an original signal pattern and a second copy type having a mirror image of said original signal pattern with a consequent displacement of one track spacing for each of a plurality of signal tracks, and at least one of said types having at least a one track displacement distinguishing characteristic, comprising:

means in said apparatus for receiving each type of media; and sensing means for recognizing said distinguishing characteristic to enable a relative displacement of at least one of said types by at least one track spacing to thereby enable scanning by said apparatus in a preferred signal pattern scanning sequence.

6. The apparatus of claim 5 wherein; said master record media type has said at least one distinguishing characteristic.

7. A method for producing a duplicate record media having at least one oxide surface from a master record media having at least one oxide surface and a recorded signal pattern in conjunction with magnetic transfer apparatus, said master record media carrying a Boustrophedonic signal pattern with, as an example, a plurality of signal tracks 1, 3, 5, 7, etc., recorded left to right, tracks 2, 4, 6, 8, etc., recorded right to left, and an increment of space between each of said tracks, comprising the steps of:

1. positioning said master record media in said apparatus with its oxide surface facing a first direction;
2. positioning said duplicate record media in said apparatus with its oxide surface facing the oxide surface of said master record media, said duplicate record media being positioned in offset relation with respect to said master record media a predetermined odd number of track spacings, such as 1, 3, 5, etc., to insure scanning compatibility in a utilization device and eliminate the need for scan rephasing; and
3. operating said transfer apparatus to effect transfer of said signal pattern from said master record media to said duplicate record media, said operation of said transfer apparatus producing a Boustrophedonic signal pattern in said duplicate record media that is a mirror image of the original signal pattern in said master record media.

8. The method of claim 7 wherein:
said master and duplicate record media each have comparable longitudinal and transverse dimensions; and wherein
the offset relation is achieved by relatively displacing said duplicate record media longitudinally with respect to said master record media.

9. The method of claim 7 wherein:
the positioning of master and duplicate record media is performed in a transfer apparatus having provision for clamping at least one of said media during operation; and wherein
the relatively offset positional relationship of said duplicate record media in relation to said master record media is a sufficient number of track spacings, such as five (5), to allow clearance for clamping of said at least one of said media.

10. Apparatus for producing a duplicate record media having at least one oxide surface from a master record media having at least one oxide surface, said master record media carrying a Boustrophedonic recorded signal pattern with, as an example, a plurality of signal tracks 1, 3, 5, 7, etc., recorded left to right, tracks 2, 4, 6, 8, etc., recorded right to left, and an increment of space between each of said tracks, comprising:
means for positioning said master record media in said apparatus with its oxide surface facing a first direction;
means for positioning said duplicate record media in said apparatus with its oxide surface facing the oxide surface of said master record media;
means for positioning said duplicate record media in offset relation with respect to said master record media in a predetermined odd number of track spacings, such as 1, 3, 5, etc., to insure scanning compatibility in a utilization device and eliminate the need for scan rephasing; and
means for operating said transfer apparatus to effect transfer of said signal pattern from said master record media to said duplicate record media, operation of said transfer apparatus producing a Boustrophedonic signal pattern in said duplicate record media that is a mirror image of the original signal pattern in said master record media.

11. The apparatus of claim 10 wherein:
said master and duplicate record media each have comparable longitudinal and transverse dimensions; and wherein
the positioning means in said apparatus is operative to relatively displace said duplicate record media longitudinally with respect to said master record media.

12. The apparatus of claim 10, wherein said media are inserted in a preferred direction, and further comprising:
means for sensing the presence of each type of media and limiting the extent of its insertion; and wherein
said offset relation is established by structural displacement of said sensing and limiting means the desired number of track spacings.

13. The apparatus of claim 10 further comprising:
means in said apparatus for clamping at least one of said media during operation; and wherein
the offset positional relationship of said duplicate record media in relation to said master record media is a sufficient number of track spacings, such as five (5), to allow clearance for clamping of said at least one of said media.

14. The apparatus of claim 13 wherein; said master record media is clamped during operation of said apparatus.